United States Patent
Zeinali et al.

(10) Patent No.: US 11,824,448 B2
(45) Date of Patent: Nov. 21, 2023

(54) MULTIPLE-OUTPUT DIRECT CURRENT (DC)-DC CONVERTER

(71) Applicants: Mohammadreza Zeinali, Tehran (IR); Samad Sheikhaei, Tehran (IR); Omid Shoaei, Tehran (IR)

(72) Inventors: Mohammadreza Zeinali, Tehran (IR); Samad Sheikhaei, Tehran (IR); Omid Shoaei, Tehran (IR)

(73) Assignees: Omid Shoaei, Tehran (IR); Samad Sheikhaei, Tehran (IR)

( * ) Notice: Subject to any disclaimer, the term of this patent is extended or adjusted under 35 U.S.C. 154(b) by 0 days.

(21) Appl. No.: 17/857,846

(22) Filed: Jul. 5, 2022

(65) Prior Publication Data
US 2022/0337160 A1 Oct. 20, 2022

(51) Int. Cl.
*H02M 3/158* (2006.01)
(52) U.S. Cl.
CPC .................... *H02M 3/1582* (2013.01)
(58) Field of Classification Search
None
See application file for complete search history.

(56) References Cited

U.S. PATENT DOCUMENTS

| | | | | |
|---|---|---|---|---|
| 9,369,033 | B2* | 6/2016 | Panigrahi | H02M 3/158 |
| 9,450,489 | B2* | 9/2016 | Gasparini | H02M 3/33561 |
| 9,479,055 | B2* | 10/2016 | Okamatsu | H03K 17/6871 |
| 9,705,393 | B2* | 7/2017 | Golder | H02M 3/158 |
| 10,164,532 | B2* | 12/2018 | Knoedgen | H02M 3/158 |
| 2020/0204074 | A1* | 6/2020 | Oyama | H02M 3/1582 |

* cited by examiner

*Primary Examiner* — Jeffery S Zweizig
(74) *Attorney, Agent, or Firm* — Bajwa IP Law Firm; Haris Zaheer Bajwa

(57) ABSTRACT

A direct current (DC)-DC converter for converting an input voltage to a plurality of output voltages. The DC-DC converter includes an inductor, a plurality of output capacitors, a plurality of output switches, and a bootstrap capacitor. The inductor is configured to be charged by applying the input voltage to the inductor. Each of the plurality of output switches is connected between the inductor and a respective output capacitor of the plurality of output capacitors. The bootstrap capacitor is connected between the inductor and each of the plurality of output switches. The bootstrap capacitor is configured to convert the input voltage to an $n^{th}$ output voltage of the plurality of output voltages. The input voltage is converted to the $n^{th}$ output voltage by coupling the inductor to an $n^{th}$ output capacitor of the plurality of output capacitors through an $n^{th}$ output switch of the plurality of output switches.

14 Claims, 5 Drawing Sheets

MULTIPLE-OUTPUT DIRECT CURRENT (DC)-DC CONVERTER

TECHNICAL FIELD

The present disclosure generally relates to power supply circuits, and particularly, to direct current (DC)-DC converters.

BACKGROUND

Function-rich system-on-chip applications require multiple power supplies to optimize overall system performances as well as to minimize power consumption. Direct current (DC)-DC converters are widely used for converting a power supply to multiple power supplies. Among various types of converters, LC (inductor-capacitor) DC-DC converters that utilize a capacitor and an inductor for each voltage output are a popular choice. However, drawbacks such as electromagnetic interference, component cost, and physical profile may prevent utilizing multiple inductors. Single inductor multiple-output (SIMO) DC-DC converters may be appropriate in integrated circuit (IC) applications since they may be area- and cost-effective, and each output voltage may have an adjustable conversion ratio.

A conventional SIMO DC-DC converter may generate multiple supply voltages. For each output, a respective output capacitor may be needed as a voltage storage element that maintains an output voltage. Also, an inductor may operate as a current storage element that transfers energy from input voltage to output voltages. To regulate each output voltage, an inductor current may be charged. Then, inductor current may be discharged in one of output capacitors to regulate corresponding voltage. Voltage levels of output voltages may be maintained by charging output capacitors in a periodic manner.

Charging and discharging an inductor may be performed by a number of switches. As a result, power efficiency of DC-DC converters may depend on an on-resistance of utilized switches. Therefore, on-resistance of switches is desired to be as small as possible. For a specific on-resistance, n-type transistor switches may be preferred to p-type transistor switches, due to higher electron mobility in n-type transistors. However, n-type transistors may require higher gate-source voltages to be turned on, necessitating usage of bootstrap circuits. A drawback in utilizing a bootstrap circuit may be requiring a large off-chip capacitor to be charged in one phase and putting a voltage of capacitor on a gate-source of n-type transistors in a next phase. Therefore, using N off-chip bootstrap capacitors and 2N pins of an IC chip to regulate N output voltages may be necessary, resulting in a costly design.

There is, therefore, a need for a DC-DC converter including a bootstrap circuit that utilizes a shared off-chip bootstrap capacitor among different outputs of the DC-DC converter.

SUMMARY

This summary is intended to provide an overview of the subject matter of the present disclosure, and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary direct current (DC)-DC converter for converting an input voltage to a plurality of output voltages. An exemplary DC-DC converter may include an inductor, a plurality of output capacitors, a plurality of output switches, and an output bootstrap capacitor. An exemplary inductor may be configured to be charged by applying the input voltage to the inductor. In an exemplary embodiment, the plurality of output capacitors may maintain the plurality of output voltages. In an exemplary embodiment, each of the plurality of output switches may be connected between the inductor and a respective output capacitor of the plurality of output capacitors. An exemplary output bootstrap capacitor may be connected between the inductor and each of the plurality of output switches. An exemplary output bootstrap capacitor may be configured to convert the input voltage to an $n^{th}$ output voltage of the plurality of output voltages where $1 \leq n \leq N$ and N is a number of the plurality of output voltages. An exemplary input voltage may be converted to the $n^{th}$ output voltage by coupling the inductor to an $n^{th}$ output capacitor of the plurality of output capacitors through an $n^{th}$ output switch of the plurality of output switches.

An exemplary DC-DC converter may further include a switching circuit. An exemplary switching circuit may be configured to apply the input voltage to a first node of the inductor responsive to the switching circuit being turned on.

An exemplary DC-DC converter may further include a first switch. An exemplary first switch may be connected between a second node of the inductor and a ground node. An exemplary first switch may be configured to couple the second node to the ground node responsive to being turned on. An exemplary second node may be connected to the output bootstrap capacitor and each of the plurality of output switches.

An exemplary DC-DC converter may further include a second switch. An exemplary second switch may be connected between the first node and the ground node. An exemplary second switch may be configured to couple the first node to the ground node responsive to the DC-DC converter operating in a buck mode.

An exemplary switching circuit may include a plurality of input switches and an input bootstrap capacitor. In an exemplary embodiment, each of the plurality of input switches may be connected between the first node and a respective voltage source of a plurality of voltage sources. An exemplary input bootstrap capacitor may be connected between the first node and each of the plurality of input switches. An exemplary input bootstrap capacitor may be configured to apply the input voltage to the first node. An exemplary input voltage may be applied to the first node by coupling an $m^{th}$ voltage source of the plurality of voltage sources to the first node. An exemplary $m^{th}$ voltage source may be coupled to the first node through an $m^{th}$ input switch of the plurality of input switches where $1 \leq m \leq M$ and M is a number of the plurality of voltage sources.

An exemplary switching circuit may further include an input bootstrap switch. An exemplary input bootstrap switch may be connected between an input bootstrap voltage source and the input bootstrap capacitor. An exemplary input bootstrap switch may be configured to apply an input bootstrap voltage to the input bootstrap capacitor responsive to the input bootstrap switch being turned on.

An exemplary $n^{th}$ output switch may include a bidirectional switch. An exemplary bidirectional switch may include a diode. An exemplary diode of the bidirectional switch may be connected between a source and a gate of the bidirectional switch.

An exemplary DC-DC converter may further include a plurality of P-channel metal-oxide-semiconductor (PMOS) switches. In an exemplary embodiment, an $n^{th}$ PMOS switch of the plurality of PMOS switches may be configured to turn on the bidirectional switch and discharge an electric current passing through the inductor. An exemplary bidirectional switch may be turned on by coupling the output bootstrap capacitor to the gate of the bidirectional switch responsive to the $n^{th}$ PMOS switch being turned on. An exemplary electric current may be discharged to the $n^{th}$ output capacitor responsive to the bidirectional switch being turned on.

An exemplary DC-DC converter may further include a plurality of low-side switches. In an exemplary embodiment, an $n^{th}$ low-side switch of the plurality of low-side switches may be connected between the bidirectional switch and the ground node. An exemplary $n^{th}$ low-side switch may be configured to couple the gate of the bidirectional switch to the ground node.

An exemplary DC-DC converter may further include an output bootstrap switch. An exemplary output bootstrap switch may be connected between an output bootstrap voltage source and the output bootstrap capacitor. An exemplary output bootstrap switch may be configured to apply an output bootstrap voltage to the output bootstrap capacitor responsive to the output bootstrap switch being turned on. An exemplary output bootstrap switch may include a bootstrap diode.

Other exemplary systems, methods, features and advantages of the implementations will be, or will become, apparent to one of ordinary skill in the art upon examination of the following figures and detailed description. It is intended that all such additional systems, methods, features and advantages be included within this description and this summary, be within the scope of the implementations, and be protected by the claims herein.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown, but is to be accorded the widest possible scope consistent with the principles and features disclosed herein.

Herein is disclosed an exemplary direct current (DC)-DC converter for converting an input voltage to a number of output voltages. An exemplary DC-DC converter may include an inductor, a bootstrap capacitor, and a number of output switches. An exemplary bootstrap capacitor may be shared among all output switches and configured to turn on output switches in a periodic manner, that is, one output switch at a time. An exemplary bootstrap capacitor may be connected between an exemplary inductor and each of output switches. An exemplary inductor may be charged by applying an input voltage to the inductor. Meanwhile, an exemplary bootstrap capacitor may be charged to a bootstrap voltage. Next, an $n^{th}$ output voltage may be generated by turning on an $n^{th}$ output switch through coupling an exemplary bootstrap capacitor to a gate of the $n^{th}$ output switch. Therefore, a bootstrap voltage on a gate-source of an exemplary $n^{th}$ output switch may cause the $n^{th}$ output switch to be turned on. As a result, a current of an exemplary inductor may be discharged in an $n^{th}$ output capacitor through an exemplary $n^{th}$ output switch, generating the $n^{th}$ output voltage on the $n^{th}$ output capacitor.

Figure 1A:
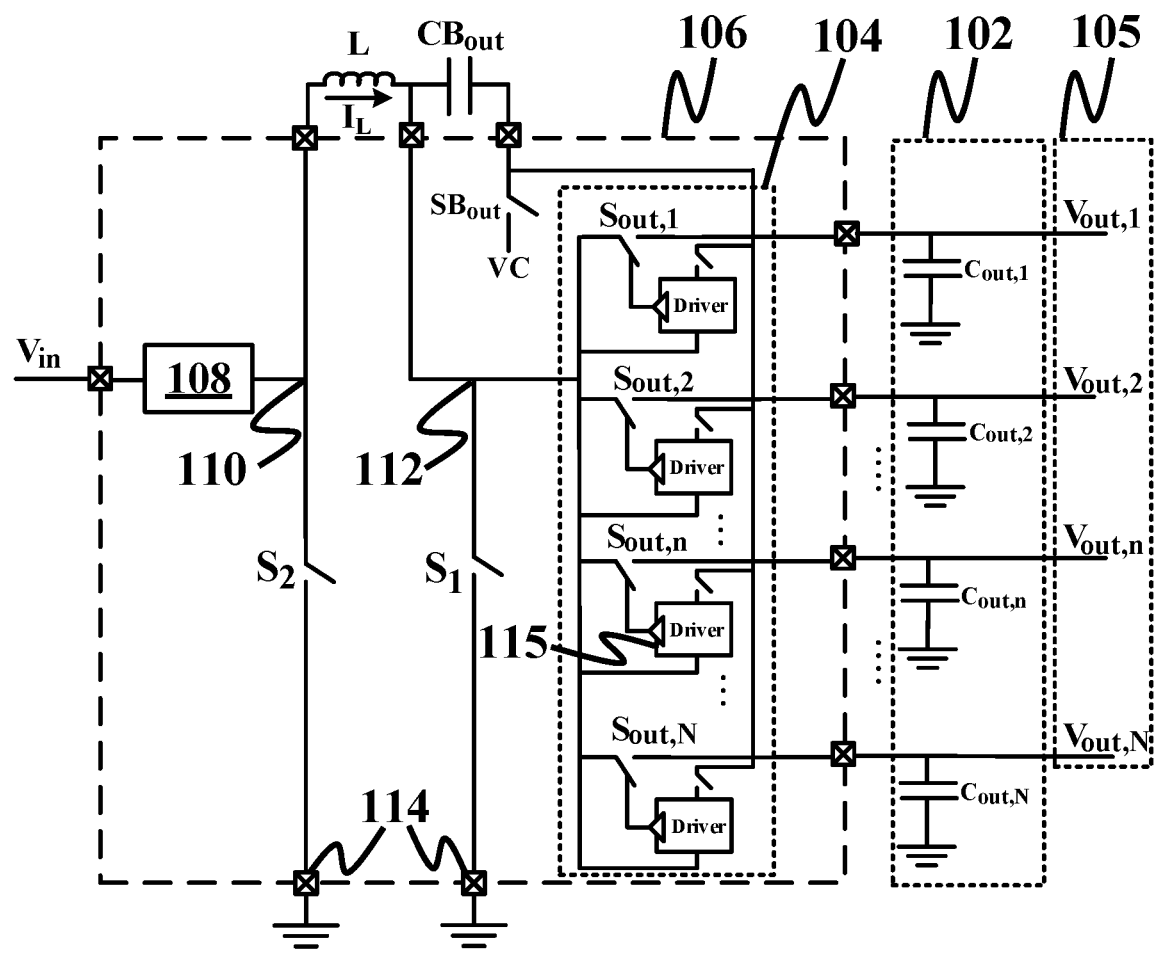
FIG. 1A shows a schematic of a DC-DC converter, consistent with one or more exemplary embodiments of the present disclosure.

FIG. 1A shows a schematic of a DC-DC converter, consistent with one or more exemplary embodiments of the present disclosure. In an exemplary embodiment, a DC-DC converter 100 may include an inductor L, a plurality of output capacitors 102, a plurality of output switches 104, and an output bootstrap capacitor $CB_{out}$. In an exemplary embodiment, DC-DC converter 100 may convert an input voltage $V_{in}$ to a plurality of output voltages 105. In an exemplary embodiment, each of plurality of output switches 104 may be connected between inductor L and a respective output capacitor of plurality of output capacitors 102. In an exemplary embodiment, an $n^{th}$ output switch $S_{out,n}$ of plurality of output switches 104 may be connected between inductor L and an $n^{th}$ output capacitor $C_{out,n}$ of plurality of output capacitors 102 where $1 \le n \le N$ and N is a number of plurality of output voltages 105. In an exemplary embodiment, output bootstrap capacitor $CB_{out}$ may be connected between inductor L and each of plurality of output switches 104. In an exemplary embodiment, each of plurality of output switches 104 may include a respective high-side N-channel metal-oxide-semiconductor field-effect transistor (MOSFET). A high-side MOSFET may refer to a transistor whose source node is not grounded. As a result, turning on a high-side transistor may require high voltage levels at a gate node, compared to a voltage supply of a circuit. In an exemplary embodiment, output bootstrap capacitor $CB_{out}$ may provide a required voltage level at a respective gate node of each of plurality of output switches 104. In an exemplary embodiment, DC-DC converter 100 may further include a controller. An exemplary controller may control switches of DC-DC converter 100. An exemplary controller may generate a sequence of control signals that may turn on or off switches of DC-DC converter 100. An exemplary sequence of control signals may be generated according to predefined time cycles for switches of DC-DC converter 100. Exemplary predefined time cycles may be set according to a capacitance of each of plurality of output capacitors 102, an inductance of inductor L, a capacitance of output bootstrap capacitor $CB_{out}$ and a maximum acceptable ripple of each of plurality of output voltages 105. A maximum acceptable ripple may be dictated by a plurality of loads connected to DC-DC converter 100.

In an exemplary embodiment, DC-DC converter 100 may be implemented utilizing an integrated circuit (IC) chip 106. In an exemplary embodiment, IC chip 106 may be utilized to implement required switches of DC-DC converter 100. Each exemplary pad of IC chip 106 is shown by a crossed square. In an exemplary embodiment, DC-DC converter 100 may be implemented by a number of off-chip elements. A required capacity of output bootstrap capacitor $CB_{out}$ in an exemplary implementation of DC-DC converter 100 may be larger than ones available in IC chip 106. Therefore, exemplary off-chip capacitors of high capacitance (in order of μF) may be required to implement output bootstrap capacitor $CB_{out}$. In an exemplary embodiment, output bootstrap capacitor $CB_{out}$ may share a pad of IC chip 106 with inductor L. As a result, in an exemplary embodiment, DC-DC converter 100 may require only one extra chip pad to be bootstrapped.

In an exemplary embodiment, inductor L may be configured to be charged by applying input voltage $V_{in}$ to inductor L. In an exemplary embodiment, output bootstrap capacitor $CB_{out}$ may be configured to convert input voltage $V_{in}$ to an $n^{th}$ output voltage $V_{out,n}$ of plurality of output voltages 105. In an exemplary embodiment, input voltage $V_{in}$ may be converted to output voltage $V_{out,n}$ by coupling output bootstrap capacitor $CB_{out}$ to a gate-source of an $n^{th}$ output switch $S_{out,n}$ of plurality of output switches 104. In an exemplary embodiment, output bootstrap capacitor $CB_{out}$ may be coupled to a gate-source of an $n^{th}$ output switch $S_{out,n}$ through a respective driver. As a result, $n^{th}$ output switch $S_{out,n}$ may be turned on and an electric current of inductor L may be discharged into $n^{th}$ output capacitor $C_{out,n}$. In an exemplary embodiment, $n^{th}$ output capacitor $C_{out,n}$ may maintain output voltage $V_{out,n}$. As described later, an exemplary driver may include a switching circuit controlled by the controller of DC-DC converter 100.

In an exemplary embodiment, inductor L may not be directly connected to output capacitor $C_{out,n}$. As a result, in an exemplary embodiment, inductor L may not be coupled to output capacitor $C_{out,n}$ when an $n^{th}$ output switch $S_{out,n}$ of plurality of output switches 104 is turned off. In an exemplary embodiment, an electric current of inductor L may not be discharged into output capacitor $C_{out,n}$ until $n^{th}$ output switch $S_{out,n}$ is turned on. In other words, in an exemplary embodiment, input voltage $V_{in}$ may not be converted to output voltage $V_{out,n}$ when inductor L is decoupled from output capacitor $C_{out,n}$, that is, when $n^{th}$ output switch $S_{out,n}$ is turned off. An exemplary controller of DC-DC converter 100 may generate a control signal to turn on $n^{th}$ output switch $S_{out,n}$. In an exemplary embodiment, input voltage $V_{in}$ may be converted to output voltage $V_{out,n}$ by coupling inductor L to output capacitor $C_{out,n}$ through an $n^{th}$ output switch $S_{out,n}$. In an exemplary embodiment, each of plurality of output voltages 105 may be maintained by a respective output capacitor of plurality of output capacitors 102. Specifically, in an exemplary embodiment, output voltage $V_{out,n}$ may include a voltage level of output capacitor $C_{out,n}$ when output capacitor $C_{out,n}$ is charged.

An exemplary DC-DC converter may further include a switching circuit 108. In an exemplary embodiment, switching circuit 108 may be configured to apply input voltage $V_{in}$ to a first node 110 of inductor L responsive to switching circuit 108 being turned on. In an exemplary embodiment, a switching state of switching circuit 108 may be controlled by the controller of DC-DC converter 100. An exemplary controller may control a switching state of each switch in switching circuit 108 by generating a number of control signals. Each exemplary control signal may be applied to a respective switch in switching circuit 108. In an exemplary embodiment, switching circuit 108 may include an input switch. Therefore, an exemplary input switch may be turned on when a control signal generated by the controller is applied to a gate of the input switch.

An exemplary DC-DC converter may further include a first switch S1. In an exemplary embodiment, first switch S1 may be connected between a second node 112 of inductor L and a ground node 114. In an exemplary embodiment, first switch S1 may be configured to couple second node 112 to ground node 114 responsive to being turned on. In an exemplary embodiment, first switch S1 may be turned on by generating a control signal utilizing the controller of DC-DC converter 100. An exemplary control signal may be applied to a gate of first switch S1. An exemplary control signal may be generated in a periodic manner. A period of generating the control signal may be set according to capacitance of each of plurality of output capacitors 102. In an exemplary embodiment, second node 112 may be connected to output bootstrap capacitor $CB_{out}$ and each of plurality of output switches 104. In an exemplary embodiment, first switch S1 may include a low-side N-channel MOSFET. A low-side MOSFET may refer to a transistor with a grounded source node.

In an exemplary embodiment, DC-DC converter 100 may further include a second switch S2. In an exemplary embodiment, second switch S2 may be connected between first node 110 and ground node 114. In an exemplary embodiment, second switch S2 may be configured to couple first node 110 to ground node 114 responsive to DC-DC converter 100 operating in a buck mode. In an exemplary embodiment, DC-DC converter 100 may operate in a buck mode when $V_{in} < V_{out,n}$. In an exemplary embodiment, second switch S2 may be turned on by generating a control signal utilizing the controller of DC-DC converter 100. An exemplary control signal may be applied to a gate of second switch S2. An exemplary control signal may be generated in a periodic manner. A period of generating the control signal may be set according to an inductance of inductor L. In an exemplary embodiment, second switch S2 may include a low-side N-channel MOSFET.

In an exemplary embodiment, DC-DC converter 100 may further include an output bootstrap switch $SB_{out}$. In an exemplary embodiment, output bootstrap switch $SB_{out}$ may be connected between an output bootstrap voltage source VC and output bootstrap capacitor $CB_{out}$. In an exemplary embodiment, output bootstrap switch $SB_{out}$ may be configured to apply an output bootstrap voltage to output bootstrap capacitor $CB_{out}$ responsive to output bootstrap switch $SB_{out}$ being turned on. In an exemplary embodiment, output bootstrap switch $SB_{out}$ may be turned on utilizing the controller of DC-DC converter 100. An exemplary controller may generate a control signal that is applied to a gate of output bootstrap switch $SB_{out}$. As a result, output bootstrap switch $SB_{out}$ may be turned on due to a gate-source voltage difference applied by the controller. In an exemplary embodiment, when a voltage level of input voltage $V_{in}$ is sufficient for driving plurality of output switches 104, input voltage $V_{in}$ may be utilized as output bootstrap voltage source VC.

In an exemplary embodiment, input voltage $V_{in}$ may be converted to each of plurality of output voltages 105 by discharging an electric current $I_L$ passing through inductor L into a respective output capacitor of plurality of output capacitors 102. Specifically, input voltage $V_{in}$ may be converted to output voltage $V_{out,n}$ by discharging electric current $I_L$ into output capacitor $C_{out,n}$. In an exemplary embodiment, discharging $I_L$ may be performed in two phases. In a first phase, in an exemplary embodiment, input voltage $V_{in}$ may be applied to inductor L by turning on switch S1 and switching circuit 108. As a result, a voltage level of first node 110 may be equal to input voltage $V_{in}$ and second node 112 may be grounded. Therefore, in an exemplary embodiment, electric current $I_L$ may increase according to $$V_{in} = L\frac{dI_L}{dt}.$$

In an exemplary embodiment, inductor L may be charged after a sufficient amount of time. Meanwhile, in an exemplary embodiment, output bootstrap switch $SB_{out}$ may also be turned on to charge output bootstrap capacitor $CB_{out}$ to the output bootstrap voltage.

In a second phase, in an exemplary embodiment, electric current $I_L$ may be discharged into output capacitor $C_{out,n}$ through output switch $S_{out,n}$. As a result, a voltage level of output capacitor $C_{out,n}$ may increase according to $$I_L = C_{out,n}\frac{dV_{out,n}}{dt}.$$

In an exemplary embodiment, first switch S1 may be turned off and output switch $S_{out,n}$ may be turned on to generate a path between inductor L and output capacitor $C_{out,n}$ for discharging electric current $I_L$. In an exemplary embodiment, output switch $S_{out,n}$ may be turned on by applying the output bootstrap voltage to a gate-source of output switch $S_{out,n}$. An exemplary output bootstrap voltage may be applied to the gate-source of output switch $S_{out,n}$ by coupling output bootstrap capacitor $CB_{out}$ to a gate of output switch $S_{out,n}$ through a driver 115 of output switch $S_{out,n}$. As a result, a voltage level of second node 112 connected to a source node of output switch $S_{out,n}$ may be equal to output voltage $V_{out,n}$ and a voltage level of a gate node of output switch $S_{out,n}$ may be equal to $V_{out,n}+VC$. Therefore, in an exemplary embodiment, a voltage difference between the gate node and the source node of output switch $S_{out,n}$ may be equal to $V_{out,n}+VC-V_{out,n}=VC$. In an exemplary embodiment, the output bootstrap voltage equal to VC may be sufficient for turning on output switch $S_{out,n}$.

Figure 1B:
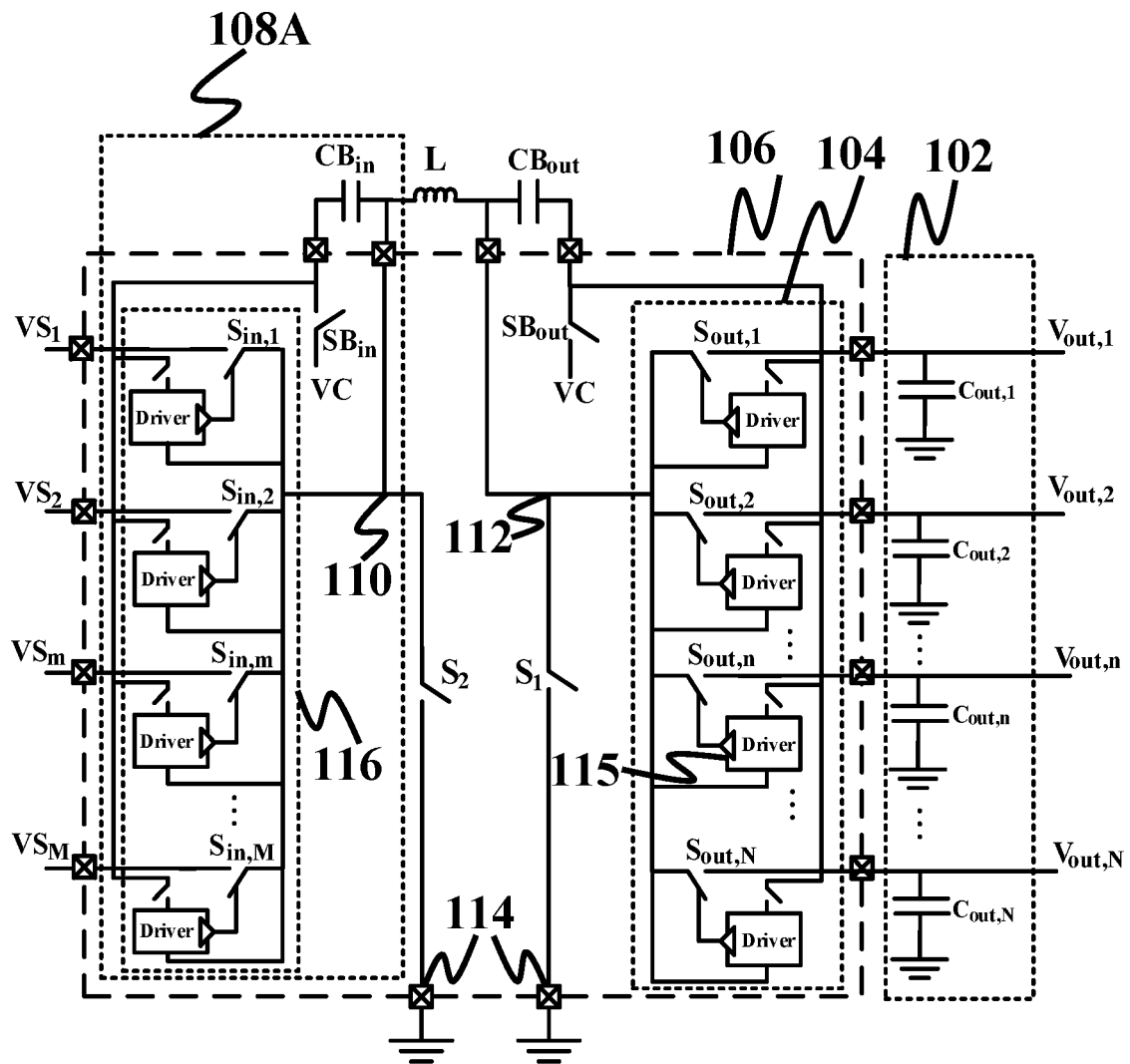
FIG. 1B shows a schematic of a multiple-input DC-DC converter, consistent with one or more exemplary embodiments of the present disclosure.

FIG. 1B shows a schematic of a multiple-input DC-DC converter, consistent with one or more exemplary embodiments of the present disclosure. Referring to FIGS. 1A and 1B, in an exemplary embodiment, DC-DC converter 100A may include numerous elements of DC-DC converter 100. In an exemplary embodiment, DC-DC converter 100A may include a switching circuit 108A. In an exemplary embodiment, switching circuit 108A may be functionally similar to switching circuit 108. In an exemplary embodiment, switching circuit 108A may include a plurality of input switches 116 and an input bootstrap capacitor $CB_{in}$. In an exemplary embodiment, each of plurality of input switches 116 may be connected between first node 110 and a respective voltage source of a plurality of voltage sources. In an exemplary embodiment, the plurality of voltage sources may include $VS_1, VS_2, \ldots,$ and $VS_M$. An exemplary voltage source may include one of a lithium-ion battery, a photovoltaic panel, a biofuel cell, and an alternating-current to DC (AC/DC) converter. In an exemplary embodiment, input bootstrap capacitor $CB_{in}$ may be connected between first node 110 and each of plurality of input switches 116. In an exemplary embodiment, each of plurality of input switches 116 may include a high-side N-channel MOSFET. Therefore, in an exemplary embodiment, a required gate-source voltage difference for each of plurality of input switches 108A may be provided utilizing input bootstrap capacitor $CB_{in}$.

In an exemplary embodiment, input bootstrap capacitor $CB_{in}$ may be configured to apply input voltage $V_{in}$ to first node 110, that is, input voltage $V_{in}$ may be applied to first node by coupling bootstrap capacitor $CB_{in}$ to gate-source of an input switch of plurality of input switches 116. In an exemplary embodiment, input voltage $V_{in}$ may be applied to first node 110 by coupling an $m^{th}$ voltage source $VS_m$ of the plurality of voltage sources to first node 110. In an exemplary embodiment, $m^{th}$ voltage source $VS_m$ may be coupled to first node 110 through an $m^{th}$ input switch $S_{in,m}$ of plurality of input switches 116 where $1 \le m \le M$ and M is a number of the plurality of voltage sources. In an exemplary embodiment, input voltage $V_{in}$ may be equal to a voltage level of voltage source $VS_m$ when input switch $S_{in,m}$ is turned on.

In an exemplary embodiment, switching circuit 108A may further include an input bootstrap switch $SB_{in}$. In an exemplary embodiment, input bootstrap switch $SB_{in}$ may be connected between an input bootstrap voltage source VC and input bootstrap capacitor $CB_{in}$. In an exemplary embodiment, input bootstrap switch $SB_{in}$ may be configured to apply an input bootstrap voltage VC to input bootstrap capacitor $CB_{in}$ responsive to input bootstrap switch $SB_{in}$ being turned on, that is, when input bootstrap switch $SB_{in}$ is turned on an input bootstrap voltage VC is applied to input bootstrap capacitor $CB_{in}$.

In an exemplary embodiment, input switch $S_{in,m}$ may be turned on in two phases. In an exemplary first phase, input bootstrap switch $SB_{in}$ may be turned on to apply the input bootstrap voltage to input bootstrap capacitor $CB_{in}$. In an exemplary second phase, the input bootstrap voltage may be applied to a gate-source of input switch $S_{in,m}$ by coupling input bootstrap capacitor $CB_{in}$ to a gate of input switch $S_{in,m}$ through a driver of input switch $S_{in,m}$. Therefore, in an exemplary embodiment, a gate-source voltage difference of input switch $S_{in,m}$ may be equal to the input bootstrap voltage. As a result, in an exemplary embodiment, input switch $S_{in,m}$ may be turned on and a voltage level of first node 110 may be equal to input voltage $V_{in}$, that is, a voltage level of voltage source $VS_m$.

Figure 1C:
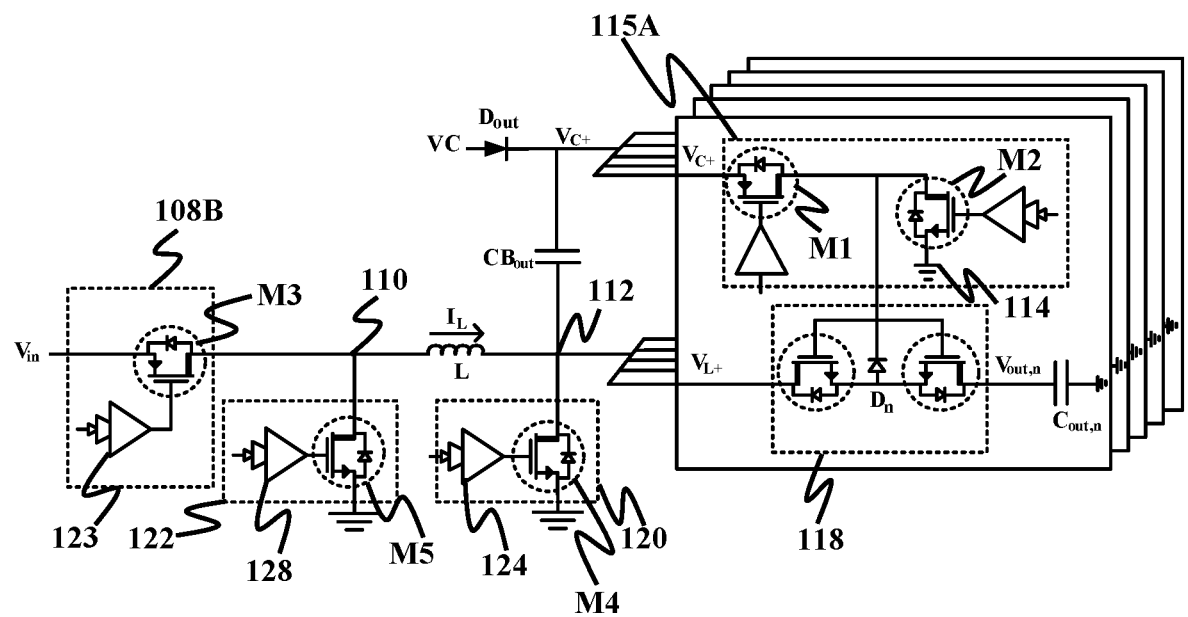
FIG. 1C shows a transistor-level schematic of a DC-DC converter, consistent with one or more exemplary embodiments of the present disclosure.

FIG. 1C shows a transistor-level schematic of a DC-DC converter, consistent with one or more exemplary embodiments of the present disclosure. Referring to FIGS. 1A and 1C, in an exemplary embodiment, a DC-DC converter 100B may include numerous elements of DC-DC converter 100.

In an exemplary embodiment, DC-DC converter 100B may be functionally similar to DC-DC converter 100. In exemplary embodiment, output switch $S_{out,n}$ may include a bidirectional switch 118. In other words, in an exemplary embodiment, bidirectional switch 118 may include an implementation of output switch $S_{out,n}$. In an exemplary embodiment, bidirectional switch 118 may include a pair of N-channel MOS (NMOS) transistors whose source nodes are connected. In an exemplary embodiment, bidirectional switch 118 may further include a diode $D_n$. In an exemplary embodiment, diode $D_n$ may be connected between a source and a gate of bidirectional switch 118.

In an exemplary embodiment, DC-DC converter 100B may further include a plurality of P-channel MOS (PMOS) switches. In an exemplary embodiment, an $n^{th}$ PMOS switch M1 of the plurality of PMOS switches may be configured to turn on bidirectional switch 118 and discharge electric current $I_L$ passing through inductor L to output capacitor $C_{out,n}$. In an exemplary embodiment, $n^{th}$ PMOS switch M1 may be turned on by applying a control signal generated by the controller to a gate of $n^{th}$ PMOS switch M1. In an exemplary embodiment, bidirectional switch 118 may be turned on by coupling output bootstrap capacitor $CB_{out}$ to the gate of bidirectional switch 118 responsive to PMOS switch M1 being turned on. In an exemplary embodiment, electric current $I_L$ may be discharged to output capacitor $C_{out,n}$ responsive to bidirectional switch 118 being turned on.

In an exemplary embodiment, DC-DC converter 100B may further include a plurality of low-side switches. In an exemplary embodiment, an $n^{th}$ low-side switch M2 of the plurality of low-side switches may be connected between bidirectional switch 118 and ground node 114. In an exemplary embodiment, low-side switch M2 may be configured to couple the gate of bidirectional switch 118 to ground node 114.

In an exemplary embodiment, DC-DC converter 100B may include a driver 115A. In an exemplary embodiment, driver 115A may include an implementation of driver 115. In an exemplary embodiment, driver 115A may include PMOS switch M1 and low-side switch M2.

In an exemplary embodiment, output bootstrap switch $SB_{out}$ may include a bootstrap diode $D_{out}$. In other words, bootstrap diode $D_{out}$ may include an exemplary implementation of output bootstrap switch $SB_{out}$.

In an exemplary embodiment, DC-DC converter 100B may further include a first NMOS switch 120 and a second NMOS switch 122. In an exemplary embodiment, first NMOS switch 120 may include an implementation of first switch S1. In an exemplary embodiment, second NMOS switch 122 may include an implementation of second switch S2.

In an exemplary embodiment, DC-DC converter 100B may further include a high-side PMOS switch 108B. In an exemplary embodiment, high-side PMOS switch 108B may include a second implementation of switching circuit 108. In an exemplary embodiment, high-side PMOS switch 108B may include a PMOS transistor M3 and a driver 123. In an exemplary embodiment, driver 123 may be configured to drive a gate of PMOS transistor M3.

In an exemplary embodiment, DC-DC converter 100B may further include a controller. An exemplary controller may control a switching state of each switch in DC-DC converter 100B by generating a plurality of control signals. Each exemplary control signal of the plurality of control signals may be applied to a gate of a respective switch. An exemplary control signal may provide a required gate-source voltage difference for turning a switch on or off. A voltage level of a control signal may be smaller than required voltage level of a gate of a switch to be turned on. Therefore, in an exemplary embodiment, each control signal may be applied to a respective switch through a respective driver. An exemplary drive circuit may be configured to translate a control signal from the controller into a power signal that is necessary to control a MOSFET. In an exemplary embodiment, first NMOS switch 120 may include a first driver 124 and a first low-side NMOS transistor M4. In an exemplary embodiment, first driver 124 may be configured to drive a gate of first low-side NMOS transistor M4. In an exemplary embodiment, second NMOS switch 122 may include a second driver 128 and a second low-side NMOS transistor M5. In an exemplary embodiment, second driver 128 may be configured to drive a gate of second low-side NMOS transistor M5.

An exemplary controller may utilize switches in DC-DC converter 100B to convert input voltage $V_{in}$ to output voltage $V_{out,n}$ in two phases. In each phase, an exemplary controller may turn on a subset of switches while may turn other switches off, as shown in Table I. In a first phase, an exemplary controller may turn on PMOS M3 and first low-side NMOS transistor M4. Meanwhile, in an exemplary embodiment, output bootstrap voltage source VC may apply the output bootstrap voltage to output bootstrap capacitor $CB_{out}$ through diode $D_{out}$. As a result, inductor L and output bootstrap capacitor $CB_{out}$ may be charged in an exemplary first phase. In a second phase, an exemplary controller may turn on PMOS switch M1. As a result, in an exemplary embodiment, a top plate of output bootstrap capacitor $CB_{out}$ may be coupled to a gate of bidirectional switch 118, the gate may be driven to the output bootstrap voltage, and consequently, bidirectional switch 118 may be turned on. Meanwhile, an exemplary controller may turn off first low-side NMOS transistor M4, resulting in discharging inductor L into output capacitor $C_{out,n}$. Besides, an exemplary controller may turn on second low-side NMOS transistor M5 and turn off PMOS transistor M3 responsive to DC-DC controller 100B operating in a buck mode, that is, when $V_{out,n}<V_{in}$. An exemplary controller may keep PMOS transistor M3 turned on and second low-side NMOS transistor M5 turned off responsive to DC-DC converter 100B operating in a boost mode, that is, $V_{out,n}>V_{in}$.

TABLE I

Switching states of DC-DC converter switches

| Switches | M1 | M2 | M3 | M4 | M5 | 118 |
|---|---|---|---|---|---|---|
| Phase 1 | Off | Off | On | On | Off | Off |
| Phase 2 (Buck mode) | On | Off | Off | Off | On | On |
| Phase 2 (Boost mode) | On | Off | On | Off | Off | On |
| Standby | Off | On | Off | Off | Off | Off |

An exemplary controller may take DC-DC controller 100B to a standby mode. In the standby mode, an exemplary controller may turn off all switches of DC-DC controller 100B, except for low-side switch M2. In an exemplary standby mode, low-side switch M2 may couple a gate of bidirectional switch 118 to ground node 114, and consequently, bidirectional switch 118 may turn off. In an exemplary embodiment, turning off bidirectional switch 118 may be slow. To turn off bidirectional switch 118 faster, in an exemplary embodiment, diode $D_n$ may couple a gate and a source of bidirectional switch 118.

Figure 2:
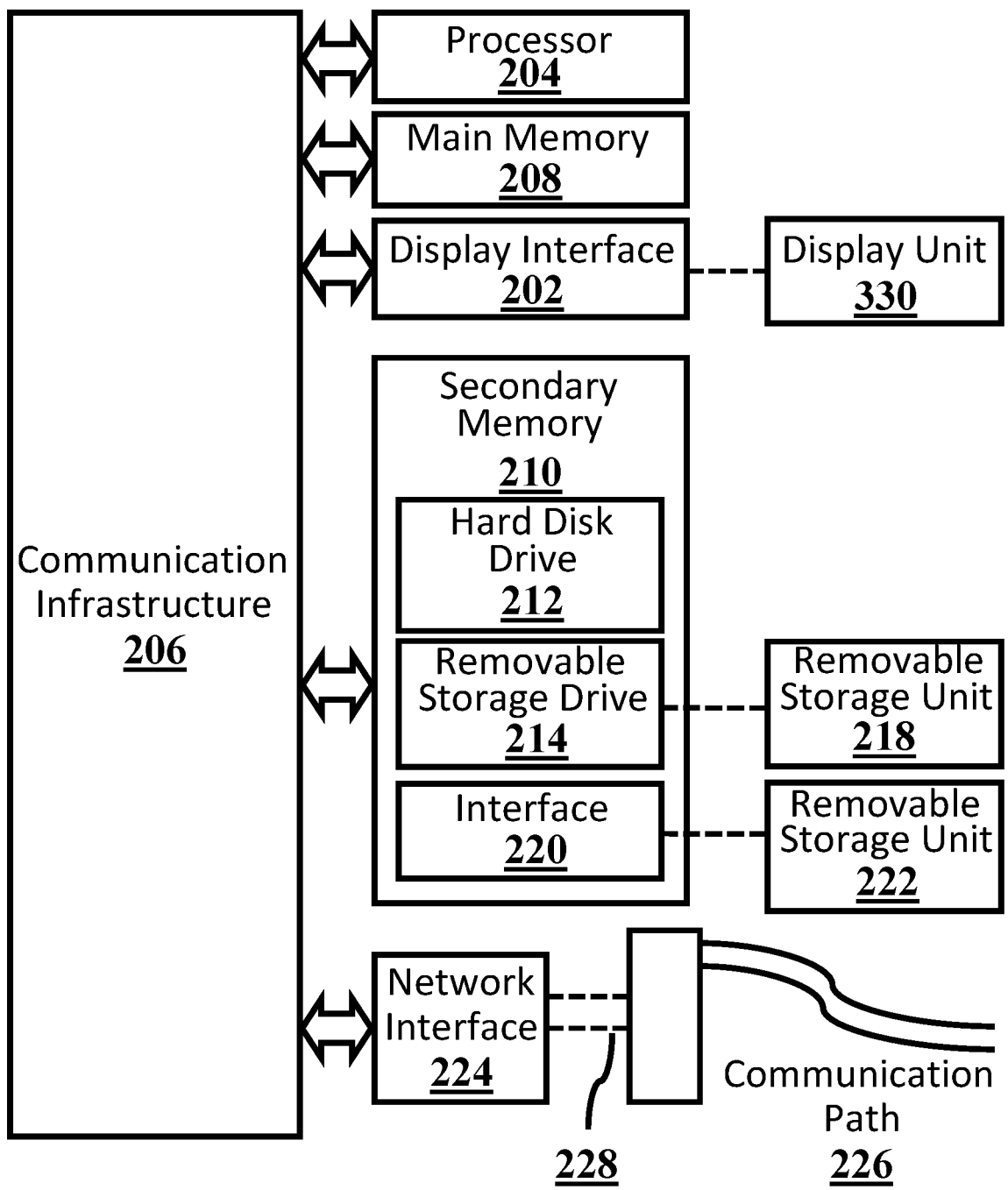
FIG. 2 shows a high-level functional block diagram of a computer system, consistent with one or more exemplary embodiments of the present disclosure.

FIG. 2 shows an example computer system 200 in which an embodiment of the present invention, or portions thereof, may be implemented as computer-readable code, consistent with exemplary embodiments of the present disclosure. For example, controlling switching states of switches in DC-DC converter 100A may be implemented in computer system 200 using hardware, software, firmware, tangible computer readable media having instructions stored thereon, or a combination thereof and may be implemented in one or more computer systems or other processing systems. Hardware, software, or any combination of such may embody any of the modules and components in FIGS. 1A-1C.

If programmable logic is used, such logic may execute on a commercially available processing platform or a special purpose device. One ordinary skill in the art may appreciate that an embodiment of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

An embodiment of the invention is described in terms of this example computer system 300. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 204 may be a special purpose (e.g., a graphical processing unit) or a general-purpose processor device. As will be appreciated by persons skilled in the relevant art, processor device 204 may also be a single processor in a multi-core/multiprocessor system, such system operating alone, or in a cluster of computing devices operating in a cluster or server farm. Processor device 204 may be connected to a communication infrastructure 206, for example, a bus, message queue, network, or multi-core message-passing scheme.

In an exemplary embodiment, computer system 200 may include a display interface 202, for example a video connector, to transfer data to a display unit 230, for example, a monitor. Computer system 200 may also include a main memory 208, for example, random access memory (RAM), and may also include a secondary memory 210. Secondary memory 210 may include, for example, a hard disk drive 212, and a removable storage drive 214. Removable storage drive 214 may include a floppy disk drive, a magnetic tape drive, an optical disk drive, a flash memory, or the like. Removable storage drive 214 may read from and/or write to a removable storage unit 218 in a well-known manner. Removable storage unit 218 may include a floppy disk, a magnetic tape, an optical disk, etc., which may be read by and written to by removable storage drive 214. As will be appreciated by persons skilled in the relevant art, removable storage unit 218 may include a computer usable storage medium having stored therein computer software and/or data.

In alternative implementations, secondary memory 210 may include other similar means for allowing computer programs or other instructions to be loaded into computer system 200. Such means may include, for example, a removable storage unit 222 and an interface 220. Examples of such means may include a program cartridge and cartridge interface (such as that found in video game devices), a removable memory chip (such as an EPROM, or PROM) and associated socket, and other removable storage units 222 and interfaces 220 which allow software and data to be transferred from removable storage unit 222 to computer system 200.

Computer system 200 may also include a communications interface 224. Communications interface 224 allows software and data to be transferred between computer system 200 and external devices. Communications interface 224 may include a modem, a network interface (such as an Ethernet card), a communications port, a PCMCIA slot and card, or the like. Software and data transferred via communications interface 224 may be in the form of signals, which may be electronic, electromagnetic, optical, or other signals capable of being received by communications interface 224. These signals may be provided to communications interface 224 via a communications path 226. Communications path 226 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 218, removable storage unit 222, and a hard disk installed in hard disk drive 212. Computer program medium and computer usable medium may also refer to memories, such as main memory 208 and secondary memory 210, which may be memory semiconductors (e.g. DRAMs, etc.).

Computer programs (also called computer control logic) are stored in main memory 208 and/or secondary memory 210. Computer programs may also be received via communications interface 224. Such computer programs, when executed, enable computer system 200 to implement different embodiments of the present disclosure as discussed herein. In particular, the computer programs, when executed, enable processor device 204 to implement the processes of the present disclosure, such as controlling switching states of DC-DC converter 100A in FIG. 1A discussed above. Accordingly, such computer programs represent controllers of computer system 200. Where an exemplary embodiment of a switching control method is implemented using software, the software may be stored in a computer program product and loaded into computer system 200 using removable storage drive 214, interface 220, and hard disk drive 212, or communications interface 224.

Embodiments of the present disclosure also may be directed to computer program products including software stored on any computer useable medium. Such software, when executed in one or more data processing device, causes a data processing device to operate as described herein. An embodiment of the present disclosure may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.).

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

EXAMPLE

In this example, a performance of a DC-DC converter (similar to DC-DC converter 100B) for converting an input voltage (similar to input voltage $V_{in}$) to a plurality of output voltages (similar to plurality of output voltages 105) is demonstrated. A voltage level of input voltage is about 4 V. The plurality of output voltages includes four voltage levels of about 1.8, 3, 10, and 12 V. An inductance of an inductor (similar to inductor L) of the DC-DC converter is about 33 µH. A capacitance of each of the plurality of output capacitors (similar to the plurality of output capacitors 102) is about 10 µF. A capacitance of an output bootstrap capacitor (similar to output bootstrap capacitor $CB_{out}$) is about 10 nF. An output bootstrap voltage source (similar to output bootstrap voltage source VC) applies an output bootstrap voltage of about 5 V to the output bootstrap capacitor.

Figure 3:
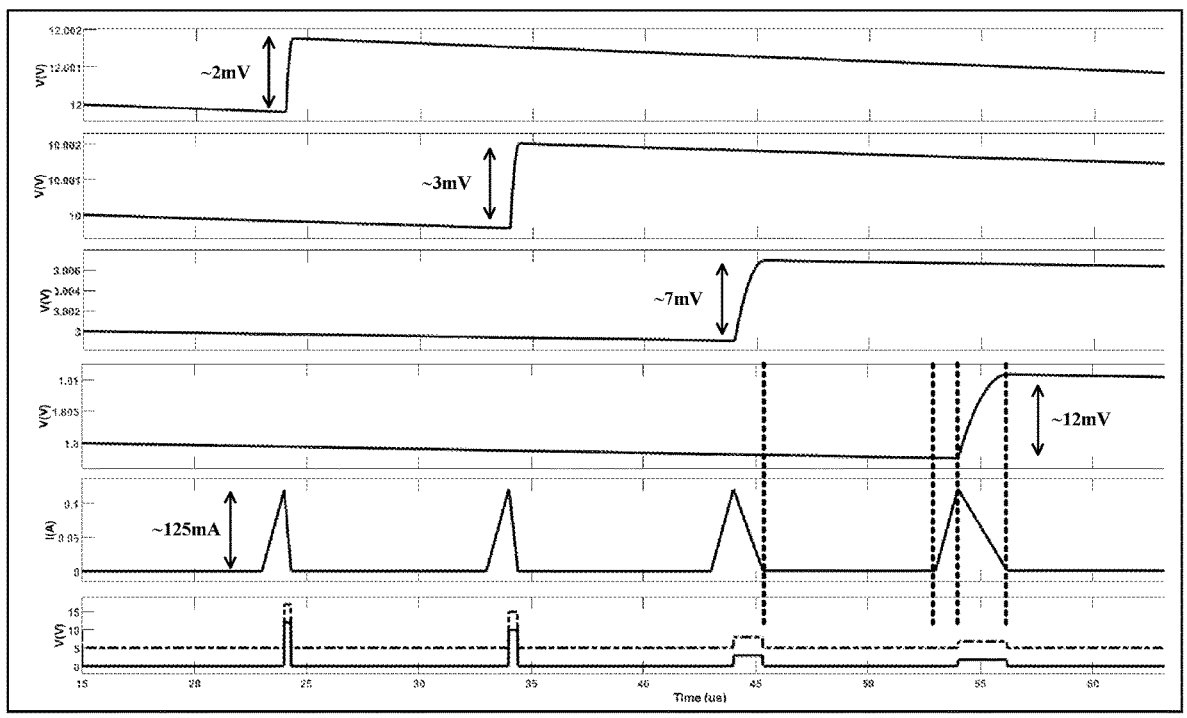
FIG. 3 shows output voltages and an inductor current of a DC-DC converter, consistent with one or more exemplary embodiments of the present disclosure.

FIG. 3 shows a graph 300 of output voltages and an inductor current of a DC-DC converter, consistent with one or more exemplary embodiments of the present disclosure. Four output voltages of the DC-DC converter are plotted in different operating phases, that is, phase 1, phase 2, and standby according to Table I. In phase 1, that is, when the inductor is charging, an electric current $I_L$ increases from about 0 mA to about 125 mA. In the phase 2, a first output switch (similar to output switch $S_{out,1}$) is turned on. Meanwhile, the electric current discharges into the first output capacitor (similar to capacitor $C_{out,1}$). As a result, a voltage level of output voltage $V_{out,1}$ increases, causing a ripple in voltage level of the first output. A magnitude of a ripple is in order of mV.

Voltage levels of nodes $V_{C+}$ and $V_{L+}$ (shown in FIG. 1C) are pulse-shaped signals in FIG. 2. A voltage level of node $V_{C+}$ is always larger than a voltage level of node $V_{L+}$ by an offset of 5 V that is equal to the output bootstrap voltage. In other words, a voltage level of node $V_{C+}$ is equal to $V_{out,n}$+VC in the phase 2. Besides, a slope of electric current $I_L$ in phase 2 is steeper for higher values of output voltages, which is in line with $$V_{out,n} = C_{out,n} \frac{dI_L}{dt}.$$

Graph 300 shows that the DC-DC converter succeeds to maintain output voltage levels to desired values with ripple magnitudes of only in mV order. A low ripple magnitude may provide different loads connected to the DC-DC converter with a stable electric power source.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations.

Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

What is claimed is:

1. A direct current (DC)-DC converter for converting an input voltage to a plurality of output voltages, comprising:
   an inductor configured to be charged by applying the input voltage to the inductor;
   an input switch configured to apply the input voltage to a first node of the inductor responsive to the input switch being turned on;
   a plurality of output capacitors configured to maintain the plurality of output voltages;
   a plurality of bidirectional switches, wherein:
      each of the plurality of bidirectional switches is connected between the inductor and a respective output capacitor of the plurality of output capacitors; and
      an $n^{th}$ bidirectional switch of the plurality of bidirectional switches comprises a diode connected between a source and a gate of the $n^{th}$ bidirectional switch where $1 \le n \le N$ and N is a number of the plurality of output voltages;
   an output bootstrap capacitor connected between the inductor and each of the plurality of bidirectional switches, the output bootstrap capacitor configured to convert the input voltage to an $n^{th}$ output voltage of the plurality of output voltages by coupling the inductor to an $n^{th}$ output capacitor of the plurality of output capacitors through the $n^{th}$ bidirectional switch;
   a first switch connected between a second node of the inductor and a ground node, the first switch configured to couple the second node to the ground node responsive to being turned on, the second node connected to the output bootstrap capacitor and each of the plurality of bidirectional switches;
   a second switch connected between the first node and the ground node, the second switch configured to couple the first node to the ground node responsive to the DC-DC converter operating in a buck mode;
   a plurality of P-channel metal-oxide-semiconductor (PMOS) switches, an $n^{th}$ PMOS switch of the plurality of PMOS switches configured to:
      turn on the $n^{th}$ bidirectional switch by coupling the output bootstrap capacitor to the gate of the $n^{th}$ bidirectional switch responsive to the $n^{th}$ PMOS switch being turned on; and
      discharge an electric current passing through the inductor to the $n^{th}$ output capacitor responsive to the $n^{th}$ bidirectional switch being turned on;
   a plurality of low-side switches, an $n^{th}$ low-side switch of the plurality of low-side switches connected between the $n^{th}$ bidirectional switch and the ground node, the $n^{th}$ low-side switch configured to couple the gate of the $n^{th}$ bidirectional switch to the ground node; and
   an output bootstrap switch connected between an output bootstrap voltage source and the output bootstrap capacitor, the output bootstrap switch configured to apply an output bootstrap voltage to the output bootstrap capacitor responsive to the output bootstrap switch being turned on.

2. A DC-DC converter for converting an input voltage to a plurality of output voltages, comprising:
   an inductor configured to be charged by applying the input voltage to the inductor;
   a plurality of output capacitors maintaining the plurality of output voltages;
   a plurality of output switches, each of the plurality of output switches connected between the inductor and a respective output capacitor of the plurality of output capacitors;
   an output bootstrap capacitor connected between the inductor and each of the plurality of output switches, the output bootstrap capacitor configured to convert the input voltage to an $n^{th}$ output voltage of the plurality of output voltages by coupling the inductor to an $n^{th}$ output capacitor of the plurality of output capacitors through an $n^{th}$ output switch of the plurality of output switches where $1 \le n \le N$ and N is a number of the plurality of output voltages; and
   a switching circuit configured to apply the input voltage to a first node of the inductor responsive to the switching circuit being turned on, the switching circuit comprising:
      a plurality of input switches, each of the plurality of input switches connected between the first node and a respective voltage source of a plurality of voltage sources; and
      an input bootstrap capacitor connected between the first node and each of the plurality of input switches, the input bootstrap capacitor configured to apply the input voltage to the first node by coupling an $m^{th}$ voltage source of the plurality of voltage sources to the first node through an $m^{th}$ input switch of the plurality of input switches where $1 \le m \le M$ and M is a number of the plurality of voltage sources.

3. The DC-DC converter of claim 2, further comprising a first switch connected between a second node of the inductor and a ground node, the first switch configured to couple the second node to the ground node responsive to being turned on, the second node connected to the output bootstrap capacitor and each of the plurality of output switches.

4. The DC-DC converter of claim 3, further comprising a second switch connected between the first node and the ground node, the second switch configured to couple the first node to the ground node responsive to the DC-DC converter operating in a buck mode.

5. The DC-DC converter of claim 2, wherein the switching circuit further comprises an input bootstrap switch connected between an input bootstrap voltage source and the input bootstrap capacitor, the input bootstrap switch configured to apply an input bootstrap voltage to the input bootstrap capacitor responsive to the input bootstrap switch being turned on.

6. The DC-DC converter of claim 2, wherein the $n^{th}$ output switch comprises a bidirectional switch.

7. The DC-DC converter of claim 6, wherein the bidirectional switch comprises a diode connected between a source and a gate of the bidirectional switch.

8. The DC-DC converter of claim 7, further comprising a plurality of PMOS switches, an $n^{th}$ PMOS switch of the plurality of PMOS switches configured to:

turn on the bidirectional switch by coupling the output bootstrap capacitor to the gate of the bidirectional switch responsive to the $n^{th}$ PMOS switch being turned on; and discharge an electric current passing through the inductor to the $n^{th}$ output capacitor responsive to the bidirectional switch being turned on.

9. The DC-DC converter of claim 8, further comprising a plurality of low-side switches, an $n^{th}$ low-side switch of the plurality of low-side switches connected between the bidirectional switch and a ground node, the $n^{th}$ low-side switch configured to couple the gate of the bidirectional switch to the ground node.

10. The DC-DC converter of claim 2, further comprising an output bootstrap switch connected between an output bootstrap voltage source and the output bootstrap capacitor, the output bootstrap switch configured to apply an output bootstrap voltage to the output bootstrap capacitor responsive to the output bootstrap switch being turned on.

11. The DC-DC converter of claim 10, wherein the output bootstrap switch comprises a bootstrap diode.

12. A DC-DC converter for converting an input voltage to a plurality of output voltages, comprising:
an inductor configured to be charged by applying the input voltage to the inductor;
a plurality of output capacitors maintaining the plurality of output voltages;
a plurality of output switches, each of the plurality of output switches connected between the inductor and a respective output capacitor of the plurality of output capacitors; and
an output bootstrap capacitor connected between the inductor and each of the plurality of output switches, the output bootstrap capacitor configured to convert the input voltage to an $n^{th}$ output voltage of the plurality of output voltages by coupling the inductor to an $n^{th}$ output capacitor of the plurality of output capacitors through an $n^{th}$ output switch of the plurality of output switches where $1 \leq n \leq N$ and N is a number of the plurality of output voltages, wherein the $n^{th}$ output switch comprises a bidirectional switch comprising a diode connected between a source and a gate of the bidirectional switch.

13. The DC-DC converter of claim 12, further comprising a plurality of PMOS switches, an $n^{th}$ PMOS switch of the plurality of PMOS switches configured to:
turn on the bidirectional switch by coupling the output bootstrap capacitor to the gate of the bidirectional switch responsive to the $n^{th}$ PMOS switch being turned on; and
discharge an electric current passing through the inductor to the $n^{th}$ output capacitor responsive to the bidirectional switch being turned on.

14. The DC-DC converter of claim 13, further comprising a plurality of low-side switches, an $n^{th}$ low-side switch of the plurality of low-side switches connected between the bidirectional switch and a ground node, the $n^{th}$ low-side switch configured to couple the gate of the bidirectional switch to the ground node.

\* \* \* \* \*